United States Patent
Baum et al.

(10) Patent No.: US 10,633,547 B2
(45) Date of Patent: Apr. 28, 2020

(54) METHOD FOR REDUCING MICROBIAL ATTACK OF INDUSTRIAL PRODUCTS

(71) Applicant: Thor GmbH, Speyer (DE)

(72) Inventors: Rüdiger Baum, Neulussheim (DE); Peter Erich Hahn, Lampertheim (DE); Hans-Jürgen Schmidt, Speyer (DE); Thomas Wunder, Neustadt a.d. Weinstrasse (DE)

(73) Assignee: Thor GmbH, Speyer (DE)

( * ) Notice: Subject to any disclaimer, the term of this patent is extended or adjusted under 35 U.S.C. 154(b) by 0 days.

(21) Appl. No.: 16/080,601

(22) PCT Filed: Feb. 15, 2017

(86) PCT No.: PCT/EP2017/000211
§ 371 (c)(1),
(2) Date: Aug. 28, 2018

(87) PCT Pub. No.: WO2017/148572
PCT Pub. Date: Sep. 8, 2017

(65) Prior Publication Data
US 2019/0071575 A1 Mar. 7, 2019

(30) Foreign Application Priority Data
Mar. 1, 2016 (EP) .................................... 16000487

(51) Int. Cl.
| | |
|---|---|
| *C09D 5/14* | (2006.01) |
| *C09D 5/02* | (2006.01) |
| *C08K 5/16* | (2006.01) |
| *C09D 7/63* | (2018.01) |
| *A01N 43/80* | (2006.01) |
| *C09D 7/61* | (2018.01) |
| *C08K 5/00* | (2006.01) |
| *C08K 5/47* | (2006.01) |

(52) U.S. Cl.
CPC ............... *C09D 5/14* (2013.01); *A01N 43/80* (2013.01); *C08K 5/16* (2013.01); *C09D 5/02* (2013.01); *C09D 5/025* (2013.01); *C09D 7/61* (2018.01); *C09D 7/63* (2018.01); *C08K 5/0058* (2013.01); *C08K 5/47* (2013.01)

(58) Field of Classification Search
CPC ........ A01N 43/80; C08K 5/16; C08K 5/0058; C08K 5/47; C09D 5/02; C09D 5/025; C09D 5/14; C09D 7/61; C09D 7/63
See application file for complete search history.

(56) References Cited

U.S. PATENT DOCUMENTS

2016/0312046 A1* 10/2016 Baum ...................... C09D 7/63

FOREIGN PATENT DOCUMENTS

| WO | WO 2007/026004 A2 | 3/2007 |
| WO | WO 2015/082063 A1 | 6/2015 |
| WO | WO 2016/034266 A1 | 3/2016 |
| WO | WO 2017/148572 A1 | 2/2017 |

OTHER PUBLICATIONS

PCT International Search Report and Written Opinion for PCT/EP2017/000211 dated May 5, 2017.

* cited by examiner

*Primary Examiner* — Anthony J Green
(74) *Attorney, Agent, or Firm* — McCarter & English, LLP

(57) ABSTRACT

The invention relates to a method for reducing microbial attack of products in the context of which 5-chloro-2-methyl-4-isothiazolin-3-one having a content of 2-methyl-4-isothiazolin-3-one in the range from 0 to 2 wt % based on the total proportion of 5-chloro-2-methyl-4-isothiazolin-3-one is employed and in a subsequent method Step at least largely decomposed. The method according to the invention is further characterized in that in a further method Step at least one further component for post-preservation of the products is employed.

9 Claims, No Drawings

METHOD FOR REDUCING MICROBIAL ATTACK OF INDUSTRIAL PRODUCTS

CROSS-REFERENCE TO RELATED APPLICATION

This application is a 35 U.S.C. § 371 National Stage filing of International Application No. PCT/EP2017/000211, filed on Feb. 15, 2017, which claims priority to European Patent Application No. 16000487.5 filed Mar. 1, 2016.

The invention relates to a method for reducing microbial attack of products, in the context of which 5-chloro-2-methyl-4-isothiazolin-3-one having a content of 2-methyl-4-isothiazolin-3-one in the range from 0 to 2 wt %, based on the total proportion of 5-chloro-2-methyl-4-isothiazolin-3-one, is employed and in a subsequent method step at least largely decomposed. The method according to the invention is further characterized in that in a further method step at least one further component for post-preservation of the products is employed.

Technical, in particular aqueous products such as paints, varnishes, emulsions, and cosmetic products are typically produced using natural or biodegradable raw materials. These raw materials and the water used as a solvent in this case are frequently contaminated with microbes, such as bacteria, yeasts, and fungi. If no preservative is used in the production of these products, they may have high microbial counts as soon as one day after production.

To ensure that these products meet the hygienic requirements and hence, to ensure the shelf life of the technical products, so-called biocides are added to the products. One of these biocides is 5-chloro-2-methylisothiazolin-3-one (CMIT). It has a good biocidal effect but various disadvantages associated with its practical use. For example, it can trigger allergies in people who handle it.

In order to overcome the disadvantages associated with this very effective CMIT, which also has disadvantages for end users, the mixture of isothiazolinone 2-methylisothiazolin-3-one (MIT) and 1,2-benzisothiazolin-3-one (BIT) disclosed in EP 1 005 271 B1 has been used as a biocide composition since the early 1990s. This mixture is distributed by Thor GmbH (Speyer, Federal Republic of Germany) as Acticide® MBS and currently represents the standard for in-can preservation of water-based paints and plasters. This biocide composition has the advantage that it combines a high level of effectiveness due to the targeted selection of the two isothiazolinones with significantly less sensitivity potential compared to 5-chloro-2-methylisothiazolin-3-one.

Despite switching to Acticide® MBS as an alternative to 5-chloro-2-methylisothiazolin-3-one, products preserved with Acticide® MBS still contain MIT, which may cause contact dermatitis and even aerogenic contact dermatitis in allergy sufferers or those who are highly sensitive.

Due to the circumstances mentioned above, however, it is not possible to completely dispense with using effective preservatives.

Published German patent application DE 198 10 819 A1 suggests a possible solution. This document relates to a method for producing coating agents, which are intended to be suitable for people allergic to isothiazolinones. As part of the method, the coating agents containing said isothiazolinones are treated with reagents, such as sodium thiosulfate, the purpose of which is to decompose the isothiazolinone(s) through chemical reaction resulting in reaction products which are harmless for people prone to allergic reactions.

However, it is disadvantageous that, according to the described method, said isothiazolinones, particularly MIT, are not quantitatively and/or irreversibly destroyed, as a result of which they are still contained in the products and reaction products and still can cause problems for people prone to allergic reactions, and/or cause contact dermatitis or aerogenic contact dermatitis in highly sensitive people. Thus, in the experiments conducted by the inventors, it was shown that 2-methylisothiazolin-3-one contained in an aqueous dispersion paint, for example, could not be quantitatively or irreversibly destroyed using sodium thiosulfate.

One object the invention is thus to provide a method, by means of which products can be produced which are also suitable for people prone to allergic reactions to 5-chloro-2-methylisothiazolin-3-one and 2-methylisothiazolin-3-one, respectively, and/or for people who are highly sensitive to 5-chloro-2-methylisothiazolin-3-one and 2-methylisothiazolin-3-one. For this purpose, the use of 5-chloro-2-methylisothiazolin-3-one should not be dispensed with in this method.

This object is achieved by means of a method for reducing microbial attack of a product comprising the steps of:

(A) providing a product;
(B) adding from 1 to 100 ppm 5-chloro-2-methyl-4-isothiazolin-3-one having a content of 2-methyl-4-isothiazolin-3-one in the range from 0 to 2 wt %, based on the total proportion of 5-chloro-2-methyl-4-isothiazolin-3-one;
(C) decomposing said 5-chloro-2-methyl-4-isothiazolin-3-one using at least one compound that decomposes 5-chloro-2-methyl-4-isothiazolone; and
(D) adding at least one biocide selected from the group consisting of 1,2-benzisothiazolin-3-one in an amount of 1 to 1,000 ppm; 2,2-dibromo-3-nitrilopropionamide in an amount ranging from 1 to 2,500 ppm; 2,2-dibromomalonamide, tetramethylol acetylenediurea, formaldehyde, glutaraldehyde, phenoxyethanol, 2-bromo-2-nitropropan-1,3-diol in an amount ranging from 1 to 2,000 ppm; zinc pyrithione in an amount ranging from 1 to 2,500 ppm; sodium pyrithione, benzyl alcohol, 3-iodopropargyl-N-butylcarbamate, 2-n-octyl-4-isothiazolin-3-one, 4,5-dichloro-2-n-octyl-4-isothiazolin-3-one, a silver source in an amount ranging from 1 to 500 ppm; 2-methyl-1,2-benzisothiazolin-3-one, ethylhexylglycerin, 1,2-octanediol, 1,2-hexanediol, 1,2-pentanediol, 1,2-decanediol, p-hydroxybenzoic acid propyl ester, sorbic acid, benzoic acid, ascorbic acid, benzalkonium chloride, dimethyl didodecyl ammonium chloride, terbutryn, diuron, carbendazim, tebuconazole, and o-phenylphenol.

According to an embodiment, the present invention does not relate to a method in which a dispersion paint is produced with a content of 50 ppm 1,2-benzisothiazolin-3-one, 100 ppm zinc-2-mercaptopyridine-N-oxide (zinc pyrithione), and 10 ppm zinc oxide.

Using the extremely effective 5-chloro-2-methylisothiazolin-3-one the present invention enables preserving the aforementioned products during production, and treating them prior to being placed on the market in such a way that they no longer contain 5-chloro-2-methylisothiazolin-3-one which could cause problems for people highly sensitive to 5-chloro-2-methylisothiazolin-3-one. The use of 5-chloro-2-methylisothiazolin-3-one during production of the products has the advantage that the microorganisms introduced by the individual components of the respective products can be effectively deactivated by using this highly effective broad-spectrum biocide yielding, after the targeted destruction of 5-chloro-2-methylisothiazolin-3-one, almost sterile products, which can be preserved afterward by using biocides.

The product, which is provided in method step (A), is generally a product selected from the group consisting of paints, interior paints, lacquers, varnishes, plasters, interior plasters, emulsions, lattices, polymer dispersions, lignosulfonates, chalk slurries, mineral slurries, ceramic compounds, adhesives, sealants, casein-containing products, starch-containing products, bitumen emulsions, surfactant solutions, fuels, cleaning agents, pigment pastes and pigment dispersions, inks, lithographic fluids, thickeners, cosmetic products, toiletries, water cycles, fluids in paper processing, fluids in leather production, fluids in textile production, drilling and cutting oils, hydraulic fluids, and coolants.

The term "product" is used to refer to both end products and intermediates. According to an especially preferred embodiment of the invention, the product is a polymer emulsion or precursor of an interior paint or interior plaster. A precursor in this case means that these products are treated prior to being placed on the market such that the 5-chloro-2-methylisothiazolin-3-one contained in the products is ideally quantitatively decomposed.

According to another embodiment of the invention, the product is a water-based product. The water content generally ranges from 5 to 99.9 wt %.

The product, which is provided in method step (A), is preferably characterized in that it has a content of 2-methyl-4-isothiazolin-3-one in the range from 0 to 1 ppm, based on the product. According to a preferred embodiment of the invention, the product provided in method step (A) has a content of 2-methyl-4-isothiazolin-3-one in the range from 0.1 ppm to 0 ppm, according to a particularly preferred embodiment containing 0 ppm. Due to the negligibly low content of 2-methyl-4-isothiazolin-3-one in the product provided, preserved products can be obtained using the method according to the invention using 5-chloro-2-methyl-4-isothiazolin-3-one with the aforementioned content of 2-methyl-4-isothiazolin-3-one, the preservative of which can readily decomposed in a targeted manner at any desired time such that (end) products can be obtained, which are free of 5-chloro-2-methyl-4-isothiazolin-3-one and 2-methyl-4-isothiazolin-3-one.

Industrial-scale production of 5-chloro-2-methylisothiazolin-3-one and/or 2-methylisothiazolin-3-one is known and can be done in different ways, all of which provide a mixture of 5-chloro-2-methylisothiazolin-3-one and 2-methylisothiazolin-3-one. For example, U.S. Pat. No. 3,849,430 A describes two alternatives which provide a mixture comprising 5-chloro-2-methylisothiazolin-3-one and/or 2-methylisothiazolin-3-one. As described above, 2-methylisothiazolin-3-one contained in the mixture comprising 5-chloro-2-methylisothiazolin-3-one and 2-methylisothiazolin-3-one cannot be readily destroyed such that (end) products preserved with 2-methylisothiazolin-3-one can cause problems for allergy sufferers or those who are highly sensitive to 2-methylisothiazolin-3-one. One possibility for avoiding these problems would be to dispense with using 5-chloro-2-methylisothiazolin-3-one containing the 2-methylisothiazolin-3-one.

The present invention however, enables the further use of 5-chloro-2-methylisothiazolin-3-one in the form of a completely novel mixture, which contains 2-methyl-4-isothiazolin-3-one in the range from 0 to 2 wt %, based on the total proportion of 5-chloro-2-methyl-4-isothiazolin-3-one, or preferably in the range from 0 to 1 wt %, based on the total amount of 5-chloro-2-methyl-4-isothiazolin-3-one in each case.

As described above, the industrial-scale production of 5-chloro-2-methylisothiazolin-3-one and 2-methylisothiazolin-3-one, respectively, always provides a mixture comprising 5-chloro-2-methylisothiazolin-3-one and 2-methylisothiazolin-3-one. While biocide compositions containing 2-methylisothiazolin-3-one having a low proportion of 5-chloro-2-methylisothiazolin-3-one are commercially available, 5-chloro-2-methyl-4-isothiazolin-3-one compositions having a content of 2-methyl-4-isothiazolin-3-one in the range from 0 to 2 wt %, based on the total proportion of 5-chloro-2-methyl-4-isothiazolin-3-one, are not commercially available.

The person skilled in the art can produce 5-chloro-2-methyl-4-isothiazolin-3-one with the low proportion of 2-methyl-4-isothiazolin-3-one required according to the invention, which is used in method step (B), from mixtures of 5-chloro-2-methylisothiazolin-3-one and 2-methylisothiazolin-3-one using separation processes known to said skilled person, such as chromatography, extraction, and/or fractional precipitation. The person skilled in the art can determine the purity of 5-chloro-2-methyl-4-isothiazolin-3-one and/or the content thereof in the corresponding products using methods known to said skilled person, for example by means of quantitative HPLC.

5-chloro-2-methylisothiazolin-3-one having a content of 2-methyl-4-isothiazolin-3-one in the range from 0 to 2 wt %, based on the total proportion of 5-chloro-2-methyl-4-isothiazolin-3-one, is added to the respective product in method step (B) in an amount ranging from 1 ppm to 100 ppm, preferably ranging from 5 ppm to 50 ppm, or particularly preferably ranging from 5 ppm to 30 ppm, based on the product.

The present invention generally relates to a method for reducing microbial attack of a product. The phrase "for reducing microbial attack of a product" in terms of the invention is understood to mean that by introducing an amount of 5-chloro-2-methyl-4-isothiazolin-3-one having a content of 2-methyl-4-isothiazolin-3-one in the range from 0 to 2 wt %, based on the total proportion of 5-chloro-2-methyl-4-isothiazolin-3-one, into the product, the microbial growth of the microorganisms contained in respective products is demonstrably slowed or completely suppressed.

In method step (B), from 1 to 100 ppm, or preferably from 5 to 50 ppm, or particularly preferably from 5 to 30 ppm 5-chloro-2-methyl-4-isothiazolin-3-one having a content of 2-methyl-4-isothiazolin-3-one in the range from 0 to 2 wt %, or preferably with a content of 2-methyl-4-isothiazolin-3-one in the range from 0 to 1 wt %, based on the total proportion of 5-chloro-2-methyl-4-isothiazolin-3-one, is added to the product. This results in a product preserved with 5-chloro-2-methyl-4-isothiazolin-3-one, the preservative of which can be readily decomposed in a targeted manner at any desired time in method step (C).

In method step (C), 5-chloro-2-methyl-4-isothiazolin-3-one added in method step (B) is decomposed or degraded using at least one compound that decomposes 5-chloro-2-methyl-4-isothiazolone.

Preferably, 5-chloro-2-methyl-4-isothiazolone is degraded and/or decomposed such that the content of 5-chloro-2-methyl-4-isothiazolone in the product within a period of less than 24 hours after the addition of the at least one 5-chloro-2-methyl-4-isothiazolone-decomposing compound is in a range as low as 0 to 0.5 ppm, or preferably in a range as low as 0 to 0.1 ppm, based on the total product.

"Decomposition of 5-chloro-2-methyl-4-isothiazolone" in the present invention means that 5-chloro-2-methyl-4-isothiazolone in method step (C) is irreversibly decomposed and/or degraded within a period of up to 24 hours, or preferably within a period of 0.5 to 12 hours, or particularly preferably within a period of 2 to 6 hours, such that, after this period, the content of 5-chloro-2-methyl-4-isothiazolone, based on the product, ranges from 0 to 0.5 ppm, or particularly preferably ranges from 0 to 0.1 ppm.

Within a period of up to 24 hours here means that 5-chloro-2-methyl-4-isothiazolone, which was added in method step (B), is decomposed within 24 hours starting at the time of exposure to the at least one 5-chloro-2-methyl-4-isothiazolone-decomposing compound, such that the total content of 5-chloro-2-methyl-4-isothiazolone after these 24 hours ranges from 0 to 0.5 ppm, based on the product.

Agent to decompose 5-chloro-2-methyl-4-isothiazolone in the present invention means a compound that decomposes and/or deactivates 5-chloro-2-methyl-4-isothiazolone by means of chemical reaction. The agent for decomposing 5-chloro-2-methyl-4-isothiazolone causes here 5-chloro-2-methyl-4-isothiazolone contained in the product to be reduced to the content in the range from 0 to 0.5 ppm within the periods defined above. Such agents and/or compounds are known to the person skilled in the art. Selecting them thus constitutes a typical professional act.

According to a preferred embodiment of the invention, the agent for decomposing 5-chloro-2-methyl-4-isothiazolone is at least one thiol compound.

According to a particularly preferred embodiment of the invention, the agent used in method step (C) for decomposing 5-chloro-2-methyl-4-isothiazolone is at least one compound selected from the group consisting of cysteine, mercaptoethanol, mercaptopropionic acid, methyl mercaptopropionate, glutathione, thioglycolate, sodium thiosulfate, sodium bisulfite, pyrithione, mercaptopyridine, dithiothreitol, mercaptoethane sulfonate, and sodium formaldehyde sulfoxylate. According to a particularly preferred embodiment of the invention, the agent for decomposing 5-chloro-2-methyl-4-isothiazolone is cysteine.

The amount of the compound(s) used to decompose 5-chloro-2-methyl-4-isothiazolone and/or the molar ratio thereof to 5-chloro-2-methyl-4-isothiazolone contained in the products can vary widely. Typically, the molar ratio of 5-chloro-2-methyl-4-isothiazolone to the at least one compound that is used to decompose it ranges from 20:1 to 1:20, preferably ranges from 5:1 to 1:5, or particularly preferably ranges from 2:1 to 1:2.

According to a preferred embodiment of the invention, the method according to the invention is characterized in that cysteine is used in an amount ranging from 1 to 200 ppm, preferably from 5 to 25 ppm, based on the product, to decompose 5-chloro-2-methyl-4-isothiazolone in method step (C).

After decomposition of 5-chloro-2-methyl-4-isothiazolin-3-one in method step (C), the product is ideally free of microbial attack, but may not be protected against newly introduced microbes due to the lack of preservatives at this time.

According to an alternative embodiment of the invention, in method step (D) of the method according to the invention the pH in the product to be preserved is set to a pH ranging from 9.5 to 12, or preferably to a pH ranging from 10.5 to 11.5. The pH is preferably set by adding NaOH and/or KOH. For a dispersion paint, the applicant was able to demonstrate a shelf life of at least 6 months after decomposition of 5-chloro-2-methyl-4-isothiazolin-3-one and setting of the pH to a pH ranging from 9.5 to 12.

According to the invention, at least one further biocide selected from the group consisting of 1,2-benzisothiazolin-3-one in an amount of 1 to 1,000 ppm; 2,2-dibromo-3-nitrilopropionamide in an amount ranging from 1 to 2,500 ppm; 2,2-dibromomalonamide, tetramethylol acetylenediurea, formaldehyde, glutaraldehyde, phenoxyethanol, 2-bromo-2-nitropropan-1,3-diol in an amount ranging from 1 to 2,000 ppm; zinc pyrithione in an amount ranging from 1 to 2,500 ppm; sodium pyrithione, benzyl alcohol, 3-iodopropargyl-N-butylcarbamate, 2-n-octyl-4-isothiazolin-3-one, 4,5-dichloro-2-n-octyl-4-isothiazolin-3-one, a silver source in an amount ranging from 1 to 500 ppm; 2-methyl-1,2-benzisothiazolin-3-one, ethylhexylglycerin, 1,2-octanediol, 1,2-hexanediol, 1,2-pentanediol, 1,2-decanediol, p-hydroxybenzoic acid propyl ester, sorbic acid, benzoic acid, ascorbic acid, benzalkonium chloride, dimethyl didodecyl ammonium chloride, terbutryn, diuron, carbendazim, tebuconazole, and o-phenylphenol is added to the product in method step (D). The amounts stated above in this case relate to the proportion of the respective biocide based on the product.

"At least one further biocide" in the present invention means that a single biocide, or a plurality, that is two, three, four, five, or more biocides, are added in method step (D).

According to a preferred embodiment of the invention, at least one further biocide selected from the group consisting of 2,2-dibromomalonamide, tetramethylol acetylenediurea, formaldehyde, glutaraldehyde, phenoxyethanol, sodium pyrithione, benzyl alcohol, 3-iodopropargyl-N-butylcarbamate, 2-n-octyl-4-isothiazolin-3-one, 4,5-dichloro-2-n-octyl-4-isothiazolin-3-one, 2-methyl-1,2-benzisothiazolin-3-one, ethylhexylglycerin, 1,2-octanediol, 1,2-hexanediol, 1,2-pentanediol, 1,2-decanediol, p-hydroxybenzoic acid propyl ester, sorbic acid, benzoic acid, ascorbic acid, benzalkonium chloride, dimethyl didodecyl ammonium chloride, terbutryn, diuron, carbendazim, tebuconazole, and o-phenylphenol is added to the product in method step (D). In the present invention, a silver source means compounds selected from elemental silver, silver salts, silver oxide, silver hydroxide, silver sulfate, silver chloride, silver complexes, and combinations thereof.

The biocide added in method step (D) is used for subsequent preservation of the products originally preserved with 5-chloro-2-methyl-4-isothiazolin-3-one. By the decomposition of 5-chloro-2-methyl-4-isothiazolin-3-one in method step (C), the products are ideally free of microbial attack, but may not be sufficiently protected against newly introduced microbes due to the lack of preservatives at this time. To ensure this type of protection, at least one biocide from the group set forth above is added in method step (D).

According to a preferred embodiment of the invention, the method according to the invention is characterized in that the following is/are added in method step (D):
said 1,2-benzisothiazolin-3-one in an amount ranging from 1 to 1,000 ppm;
said 2,2-dibromomalonamide in an amount ranging from 1 to 2,500 ppm;
said 2-bromo-2-nitropropane-1,3-diol in an amount ranging from 1 to 2,000 ppm;
said zinc pyrithione in an amount ranging from 1 to 2,500 ppm;
elemental silver in an amount ranging from 1 to 500 ppm;
silver oxide in an amount ranging from 1 to 500 ppm;
silver chloride in an amount ranging from 1 to 500 ppm;

said 2,2-dibromomalonamide in an amount ranging from 1 to 2,500 ppm;
said tetramethylol acetylenediurea in an amount ranging from 5 to 5,000 ppm;
said formaldehyde in an amount ranging from 5 to 500 ppm;
said glutaraldehyde in an amount ranging from 5 to 500 ppm;
said phenoxyethanol in an amount ranging from 10 to 2,5000 ppm;
said 2-bromo-2-nitropropane-1,3-diol in an amount ranging from 1 to 2,000 ppm;
said sodium pyrithione in an amount ranging from 1 to 2,500 ppm;
said benzyl alcohol in an amount ranging from 10 to 2,5000 ppm;
said 3-iodopropargyl-N-butylcarbamate in an amount ranging from 10 to 2,000 ppm;
said 2-n-octyl-4-isothiazolin-3-one in an amount ranging from 10 to 2,000 ppm;
said 4,5-dichloro-2-n-octyl-4-isothiazolin-3-one in an amount ranging from 10 to 2,000 ppm;
said 2-methyl-1,2-benzisothiazolin-3-one in an amount ranging from 1 to 1,000 ppm;
said ethylhexylglycerin in an amount ranging from 10 to 20,000 ppm;
said 1,2-pentanediol in an amount ranging from 10 to 20,000 ppm;
said 1,2-hexanediol in an amount ranging from 10 to 20,000 ppm;
said 1,2-octanediol in an amount ranging from 10 to 2,000 ppm;
said 1,2-decanediol in an amount ranging from 10 to 20,000 ppm;
said p-hydroxybenzoic acid propyl ester in an amount ranging from 10 to 10,000 ppm;
said sorbic acid in an amount ranging from 10 to 10,000 ppm;
said benzoic acid in an amount ranging from 10 to 10,000 ppm;
said ascorbic acid in an amount ranging from 10 to 10,000 ppm;
said benzalkonium chloride in an amount ranging from 10 to 5,000 ppm;
said dimethyl didodecyl ammonium chloride in an amount ranging from 10 to 5,000 ppm;
said terbutryn in an amount ranging from 10 to 2,000 ppm;
said diuron in an amount ranging from 10 to 2,000 ppm;
said carbendazim in an amount ranging from 10 to 2,000 ppm;
said tebuconazole in an amount ranging from 10 to 2,000 ppm; and/or
said o-phenylphenol in an amount ranging from 1 to 10,000 ppm; based on the product to be preserved in each case.

In the method according to the invention, one of the biocides set forth above may be added to the product in method step (D), in the amount indicated in relation to the product to be preserved. However, a plurality, that is two, three, and more, of the biocides set forth above may also be added to the product in method step (D), in the quantity indicated in relation to the product to be preserved.

According to a preferred embodiment of the invention, a component selected from the group ethylenediaminetetraacetate, a zinc source, and a lithium source is added to the product in a further method step, method step (E). Adding the further component in method step (D) causes a boost in effectiveness of the at least one biocide added in method step (D).

According to a preferred embodiment of the invention, at least one zinc compound selected from the group consisting of zinc oxide, zinc chloride, zinc sulfate, zinc phosphate, zinc hydroxide, zinc carbonate, zinc ascorbate, zinc dehydracetate, and zinc carboxylate is added to the product, in method step (E), in an amount ranging from 10 to 5,000 ppm, based on the product. According to a particularly preferred embodiment of the invention, at least one zinc compound selected from zinc oxide, zinc chloride, and zinc carbonate is added to the product, in method step (E), in an amount ranging from 10 to 5,000 ppm, based on the product.

According to a preferred embodiment of the invention, at least one lithium compound, preferably selected from the group consisting of lithium chloride, lithium carbonate, lithium sulfate, and lithium hydroxide, is added to the product, in method step (E), in an amount ranging from 10 to 5,000 ppm, based on the product. According to a particularly preferred embodiment of the invention, at least one lithium compound selected from lithium chloride and lithium carbonate is added to the product, in method step (E), in an amount ranging from 10 to 5,000 ppm, based on the product.

The present invention is described in more detail by the following example:

20 ppm 5-chloro-2-methylisothiazolin-3-one, with a content of 2-methylisothiazolin-3-one of <1 wt %, was added to a preservative-free styrene acrylate dispersion. The styrene acrylate dispersion preserved in this manner was then used to produce a water-based dispersion paint. The paint produced had the following composition:

25.7 wt % water
0.2 wt % acrylate-based wetting and dispersion agents
0.2 wt % mineral oil-based defoamer
2.0 wt % water softener (sodium polyphosphate)
0.2 wt % ammonia
4.0 wt % titanium oxide (pigment)
51.0 wt % calcium carbonate (filler)
5.0 wt % talcum (filler)
0.4 wt % cellulose ether
2.0 wt % organic solvent for lowering the minimum film-forming temperature
9.0 wt % of the styrene acrylate dispersion preserved with 20 ppm 5-chloro-2-methylisothiazolin-3-one
20 ppm 5-chloro-2-methylisothiazolin-3-one, with a content of 2-methylisothiazolin-3-one of <1 wt %

By microbiological testing, no microbial growth was found in the dispersion paint, whereas microbial growth was detectable in individual components. The highly effective 5-chloro-2-methylisothiazolin-3-one was thus sufficient for completely killing off the microorganisms introduced by the individual components of the paint.

In order to produce a paint, which is harmless for allergy suffers with respect to the 5-chloro-2-methylisothiazolin-3-one and 2-methylisothiazolin-3-one, from the dispersion paint, which contained significant quantities of 5-chloro-2-methylisothiazolin-3-one, these isothiazolin-3-ones were decomposed by adding 50 ppm cysteine, based on the dispersion paint. As soon as 3 hours later, no more 5-chloro-2-methylisothiazolin-3-one was detectable in the dispersion paint by HPLC.

The paint produced in this manner was now free of microorganisms through the use of the effective broad-spectrum biocide 5-chloro-2-methylisothiazolin-3-one, but susceptible to newly introduced microorganisms, which can infiltrate the paint during storage, due to the decomposition of the biocide by cysteine.

In order to protect the paint from such a microbial attack during storage, 50 ppm 2-methyl-1,2-benzisothiazolin-3-one and 10 ppm zinc oxide, based on the dispersion paint, were added to the dispersion paint for post-preservation. The paint produced in this manner exhibited a shelf life of at least 6 months.

The invention claimed is:

1. A method for reducing microbial attack of a product comprising the steps of:
   (A) providing a product; and
   (B) adding from 1 to 100 ppm 5-chloro-2-methyl-4-isothiazolin-3-one having a content of 2-methyl-4-isothiazolin-3-one in the range from 0 to 2 wt %, based on the total proportion of the 5-chloro-2-methyl-4-isothiazolin-3-one;
   (C) decomposing said 5-chloro-2-methyl-4-isothiazolin-3-one using at least one compound that decomposes 5-chloro-2-methyl-4-isothiazolone; and
   (D) adding at least one biocide selected from the group consisting of 1,2-benzisothiazolin-3-one in an amount of 1 to 1,000 ppm; 2,2-dibromo-3-nitrilopropionamide in an amount ranging from 1 to 2,500 ppm; 2,2-dibromomalonamide, tetramethylol acetylenediurea, formaldehyde, glutaraldehyde, phenoxyethanol, 2-bromo-2-nitropropan-1,3-diol in an amount ranging from 1 to 2,000 ppm; zinc pyrithione in an amount ranging from 1 to 2,500 ppm; sodium pyrithione, benzyl alcohol, 3-iodopropargyl-N-butylcarbamate, 2-n-octyl-4-isothiazolin-3-one, 4,5-dichloro-2-n-octyl-4-isothiazolin-3-one, a silver source in an amount ranging from 1 to 500 ppm; 2-methyl-1,2-benzisothiazolin-3-one, ethylhexylglycerin, 1,2-octanediol, 1,2-hexanediol, 1,2-pentanediol, 1,2-decanediol, p-hydroxybenzoic acid propyl ester, sorbic acid, benzoic acid, ascorbic acid, benzalkonium chloride, dimethyl didodecyl ammonium chloride, terbutryn, diuron, carbendazim, tebuconazole, and o-phenylphenol.

2. The method according to claim 1, characterized in that the following is/are added in method step (D):
   said 2,2-dibromomalonamide in an amount ranging from 1 to 2,500 ppm;
   said tetramethylol acetylenediurea in an amount ranging from 5 to 5,000 ppm;
   said formaldehyde in an amount ranging from 5 to 500 ppm;
   said glutaraldehyde in an amount ranging from 5 to 500 ppm;
   said phenoxyethanol in an amount ranging from 10 to 25,000 ppm;
   said 2-bromo-2-nitropropane-1,3-diol in an amount ranging from 1 to 2,000 ppm;
   said sodium pyrithione in an amount ranging from 1 to 2,500 ppm;
   said benzyl alcohol in an amount ranging from 10 to 25,000 ppm;
   said 3-iodopropargyl-N-butylcarbamate in an amount ranging from 10 to 2,000 ppm;
   said 2-n-octyl-4-isothiazolin-3-one in an amount ranging from 10 to 2,000 ppm;
   said 4,5-dichloro-2-n-octyl-4-isothiazolin-3-one in an amount ranging from 10 to 2,000 ppm;
   said 2-methyl-1,2-benzisothiazolin-3-one in an amount ranging from 1 to 1,000 ppm;
   elemental silver in an amount ranging from 1 to 500 ppm;
   silver oxide in an amount ranging from 1 to 500 ppm;
   silver chloride in an amount ranging from 1 to 500 ppm;
   said ethylhexylglycerin in an amount ranging from 10 to 20,000 ppm;
   said 1,2-pentanediol in an amount ranging from 10 to 20,000 ppm;
   said 1,2-hexanediol in an amount ranging from 10 to 20,000 ppm;
   said 1,2-octanediol in an amount ranging from 10 to 2,000 ppm;
   said 1,2-decanediol in an amount ranging from 10 to 20,000 ppm;
   said p-hydroxybenzoic acid propyl ester in an amount ranging from 10 to 10,000 ppm;
   said sorbic acid in an amount ranging from 10 to 10,000 ppm;
   said benzoic acid in an amount ranging from 10 to 10,000 ppm;
   said ascorbic acid in an amount ranging from 10 to 10,000 ppm;
   said benzalkonium chloride in an amount ranging from 10 to 5,000 ppm;
   said dimethyl didodecyl ammonium chloride in an amount ranging from 10 to 5,000 ppm;
   said terbutryn in an amount ranging from 10 to 2,000 ppm;
   said diuron in an amount ranging from 10 to 2,000 ppm;
   said carbendazim in an amount ranging from 10 to 2,000 ppm;
   said tebuconazole in an amount ranging from 10 to 2,000 ppm; and/or
   said o-phenylphenol in an amount ranging from 1 to 10,000 ppm;
   based on the product to be preserved in each case.

3. The method according to claim 1, further comprising, in step (D) setting the pH of the product to a range from pH 9 to 12.

4. The method according to claim 1, characterized in that a component selected from the group consisting of ethylenediaminetetraacetate, a zinc source, and a lithium source is added in a further method step (E).

5. The method according to claim 4, characterized in that the zinc source is added in an amount ranging from 10 to 5000 ppm, based on the product, and is at least one compound selected from the group consisting of zinc oxide, zinc chloride, zinc sulfate, zinc phosphate, zinc hydroxide, zinc carbonate, zinc ascorbate, zinc dehydroacetate, and zinc carboxylate.

6. The method according to claim 4, characterized in that the lithium source is added in an amount ranging from 10 to 5000 ppm, based on the product, and is at least one compound selected from the group consisting of lithium chloride, lithium carbonate, lithium sulfate, and lithium hydroxide.

7. The method according to claim 1, characterized in that a compound is used in method step (C), which is selected from the group consisting of cysteine, mercaptoethanol, mercaptopropionic acid, methyl mercaptopropionate, glutathione, thioglycolate, sodium thiosulfate, sodium bisulfite, pyrithione, mercaptopyridine, dithiothreitol, mercaptoethane sulfonate, and sodium formaldehyde sulfoxylate.

8. The method according to claim 1, characterized in that a product containing 2-methyl-4-isothiazolin-3-one in the range from 0 to 1 ppm is provided in method step (A).

9. The method according to claim 1, characterized in that the product is selected from the group consisting of paints, interior paints, lacquers, varnishes, plasters, interior plasters, emulsions, lattices, polymer dispersions, lignosulfonates, chalk slurries, mineral slurries, ceramic compounds, adhesives, sealants, casein-containing products, starch-containing products, bitumen emulsions, surfactant solutions, fuels, cleaning agents, pigment pastes and pigment dispersions, inks, lithographic fluids, thickeners, cosmetic products, toiletries, water cycles, fluids in paper processing, fluids in leather production, fluids in textile production, drilling and cutting oils, hydraulic fluids, and coolants.

\* \* \* \* \*